UNITED STATES PATENT OFFICE.

CARL GRÜNZWEIG, OF LUDWIGSHAFEN, GERMANY.

MANUFACTURE OF STONE, &c., FROM KIESELGUHR, &c.

SPECIFICATION forming part of Letters Patent No. 620,446, dated February 28, 1899.

Application filed January 14, 1898. Serial No. 666,698. (No specimens.)

*To all whom it may concern:*

Be it known that I, CARL GRÜNZWEIG, doctor of philosophy, a subject of the King of Bavaria, residing at Ludwigshafen-on-the-Rhine, in the Kingdom of Bavaria, have invented new and useful improvements in the manufacture of a stone or molded blocks from kieselguhr or infusorial earth or other amorphous silicious earths, of which the following is a specification.

My invention relates to a process for manufacturing a light artificial stone from infusorial earth approximately similar to cork both as being a bad conductor of heat and in respect of its specific gravity, while it has the advantage of being readily able to withstand a very high temperature, which is not the case with cork.

The process has for its object to unite the particles of kieselguhr in such a way that they shall include interstitial air-spaces as small as possible and to fuse or cake them with the aid of an argillaceous binding material and, if necessary, of a small proportion of a flux only to a degree which will impart the solidity necessary for practical use. There is thus obtained a porous mass, a kind of mineral cellular texture which may contain even large air-spaces.

The following example indicates more exactly how the invention is to be performed: Fifteen parts of infusorial earth or other amorphous silicious earths, one part of clay, and fifteen parts of cork (as finely divided as possible) or similar proportions, these varying with the kind of raw materials used, are kneaded with water to from a plastic paste. The larger the air-spaces to be included in the mass the coarser must be the particles of the cork mixed with the other materials. The duly-molded pieces are next dried and then subjected to a red heat until the cork is burned, whereby the desired porous mass is obtained.

In all cases where a high degree of solidity is necessary for the purpose for which the material is intended the finished objects can be provided with a solid coating of glaze. As this glaze will have to be worked with a cutting-tool, an emulsion of clay with tar and water-glass is especially applicable for the purpose. If the mass is not required to be capable of being worked, the glazes already customarily used in ceramic manufacture may be employed.

Having now particularly described and ascertained the nature of this invention and in what manner the same is to be performed, I declare that what I claim is—

1. The herein-described method of making artificial stone, which consists in preparing a moist mixture or paste of infusorial earth or the like, a binding material, and cork, the latter and the infusorial earth being provided in approximately equal quantities, molding and drying the mixture, and heating the molded objects to consume or decompose the cork.

2. The herein-described method of making artificial stone, which consists in preparing a moist mixture or paste of infusorial earth or the like, a binding material, and a carbonizable material, molding and drying said mixture, heating the molded objects to consume or decompose the carbonizable material, and applying upon their surface, as a glaze, an emulsion of tar with clay and water-glass.

In testimony whereof I have signed my name to this specification in the presence of two subscribing witnesses.

CARL GRÜNZWEIG.

Witnesses:
 CARL MESSER,
 BERNHARD C. HESSE.